United States Patent Office 3,636,218
Patented Jan. 18, 1972

3,636,218
PHARMACEUTICAL COMPOSITIONS AND METHODS CONTAINING 1,2,3,4-TETRAHYDROBENZOTHIENO[2,3-c]PYRIDINES
John T. Suh, Mequon, Wis., assignor to Colgate-Palmolive Company, New York, N.Y.
No Drawing. Continuation-in-part of applications Ser. No. 705,909, Feb. 16, 1968, now Patent No. 3,520,895, and Ser. No. 809,003, Mar. 20, 1969, now Patent No. 3,518,278, which is a continuation-in-part of application Ser. No. 621,475, Mar. 8, 1967. This application Oct. 22, 1969, Ser. No. 868,573
Int. Cl. A61k 27/00
U.S. Cl. 424—263
7 Claims

ABSTRACT OF THE DISCLOSURE

The compositions contain in combination a pharmaceutical diluent and a 1,2,3,4-tetrahydrobenzothieno[2,3-c]pyridine and are useful as central nervous system depressants and tranquilizing agents. A composition disclosed contains 6-chloro - 1,2,3,4 - tetrahydrobenzothieno[2,3-c]pyridine in combination with a pharmaceutical diluent.

RELATED CASES

The present application is a continuation-in-part of my copending applications Ser. No. 705,909, filed Feb. 16, 1968, now U.S. Pat. No. 3,520,895, and Ser. No. 809,003, filed Mar. 20, 1969, now U.S. Pat. No. 3,518,278, which are in turn continuations-in-part of my earlier application Ser. No. 621,475, filed Mar. 8, 1967, now abandoned.

DETAILED DESCRIPTION

The pharmaceutical compositions of the present invention contain as active ingredients a safe and effective amount of a compound of the following formula:

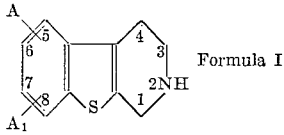

Formula I wherein A and $A_1$ are selected from hydrogen, hydroxy, lower alkyl groups of 1 to 4 carbon atoms such as methyl, ethyl or isopropyl, lower alkoxy groups such as methoxy, ethoxy and propoxy fluoro, chloro, bromo, iodo and trifluoromethyl.

The basic starting materials employed in the preparation of the compounds of the present invention are β-(3-thianaphthenyl)ethylamines of the formula:

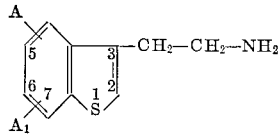

Formula II in which A and $A_1$ are as previously defined. The ethylamines may be prepared from the corresponding cyano compounds as described in the literature (Herz J.A.C.S. 72, p. 4999 (1950) and British Pat. No. 855,115).

The ethylamine starting materials may also be prepared by treating the corresponding acid with thionyl chloride followed by treatment with sodium azide and acid hydrolysis. The process may be illustrated as follows:

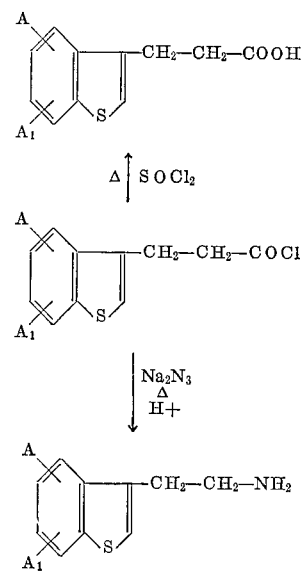

wherein A and $A_1$ are as previously described.

Representative of the amines which may be used as starting materials are the following compounds:

β-[3-thianaphthenyl]ethylamine,
β-[3-(5-fluoro)-thianaphthenyl]ethylamine,
β-[3-(6-fluoro)-thianaphthenyl]ethylamine,
β-[3-(4-fluoro)-thianaphthenyl]ethylamine,
β-[3-(7-fluoro)-thianaphthenyl]ethylamine,
β-[3-(5-chloro)-thianaphthenyl]ethylamine,
β-[3-(6-chloro)-thianaphthenyl]ethylamine,
β-[3-(4-chloro)-thianaphthenyl]ethylamine,
β-[3-(7-chloro)-thianaphthenyl]ethylamine,
β-[3-(5-trifluoromethyl)-thianaphthenyl]ethylamine,
β-[3-(6-trifluoromethyl)-thianaphthenyl]ethylamine,
β-[3-(4-trifluoromethyl)-thianaphthenyl]ethylamine,
β-[3-(7-trifluoromethyl)-thianaphthenyl]ethylamine,
β-[3-(5,6-dimethoxy)thianaphthenyl]ethylamine,
β-[3-(5-methoxy)-thianaphthenyl]ethylamine,
β-[3-(6-methoxy)-thianaphthenyl]ethylamine,
β-[3-(4-methoxy)-thianaphthenyl]ethylamine,
β-[3-(7-methoxy)-thianaphthenyl]ethylamine,
β-[3-(5-hydroxy-thianaphthenyl]ethylamine,
β-[3-(6-hydroxy)-thianaphthenyl]ethylamine,
β-[3-(5,6-hydroxy)-thianaphthenyl]ethylamine,
β-[3-(5-bromo)-thianaphthenyl]ethylamine,
β-[3-(6-bromo)-thianaphthenyl]ethylamine,
β-[3-(5-iodo)-thianaphthenyl]ethylamine, and
β-[3-(6-iodo)-thianaphthenyl]ethylamine.

The compounds of the present invention may be conveniently prepared by several methods. In the preferred practice of the invention they are prepared by treating the desired ethylamine with paraformaldehyde at a temperature of about 20° to 100° for one to two hours in the presence of a mineral acid such as hydrochloric acid. The compounds may also be prepared by reducing the corresponding lactam with lithium aluminum hydride or another suitable chemical reducing agent. The process may be diagrammed as follows:

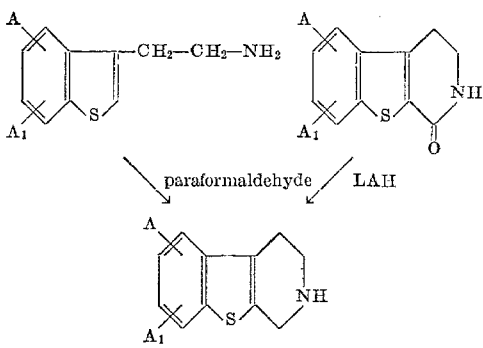

in which A and A₁ are as previously described.

Representative of the compounds which may be prepared by the described processes are the following:

1,2,3,4-tetrahydrobenzothieno[2,3-c]pyridine,
6-fluoro-1,2,3,4-tetrahydrobenzothieno[2,3-c]pyridine,
7-fluoro-1,2,3,4-tetrahydrobenzothieno[2,3-c]pyridine,
5-fluoro-1,2,3,4-tetrahydrobenzothieno[2,3-c]pyridine,
8-fluoro-1,2,3,4-tetrahydrobenzothieno[2,3-c]pyridine,
6-chloro-1,2,3,4-tetrahydrobenzothieno[2,3-c]pyridine,
7-chloro-1,2,3,4-tetrahydrobenzothieno[2,3-c]pyridine,
5-chloro-1,2,3,4-tetrahydrobenzothieno[2,3-c]pyridine,
8-chloro-1,2,3,4-tetrahydrobenzothieno[2,3-c]pyridine,
6-trifluoromethyl-1,2,3,4-tetrahydrobenzothieno[2,3-c] pyridine,
7-trifluoromethyl-1,2,3,4-tetrahydrobenzothieno[2,3-c] pyridine,
5-trifluoromethyl-1,2,3,4-tetrahydrobenzothieno[2,3-c] pyridine,
8-trifluoromethyl-1,2,3,4-tetrahydrobenzothieno[2,3-c] pyridine,
6,7-dimethoxy-1,2,3,4-tetrahydrobenzothieno[2,3-c] pyridine,
6-methoxy-1,2,3,4-tetrahydrobenzothieno[2,3-c]pyridine,
7-methoxy-1,2,3,4-tetrahydrobenzothieno[2,3-c]pyridine,
5-methoxy-1,2,3,4-tetrahydrobenzothieno[2,3-c]pyridine,
8-methoxy-1,2,3,4-tetrahydrobenzothieno[2,3-c]pyridine,
6-hydroxy-1,2,3,4-tetrahydrobenzothieno[2,3-c]pyridine,
7-hydroxy-1,2,3,4-tetrahydrobenzothieno[2,3-c]pyridine,
5-hydroxy-1,2,3,4-tetrahydrobenzothieno[2,3-c]pyridine,
8-hydroxy-1,2,3,4-tetrahydrobenzothieno[2,3-c]pyridine,
6,7-dihydroxy-1,2,3,4-tetrahydrobenzothieno[2,3-c] pyridine,
6-bromo-1,2,3,4-tetrahydrobenzothieno[2,3-c]pyridine,
7-bromo-1,2,3,4-tetrahydrobenzothieno[2,3-c]pyridine,
5-bromo-1,2,3,4-tetrahydrobenzothieno[2,3-c]pyridine,
8-bromo-1,2,3,4-tetrahydrobenzothieno[2,3-c]pyridine,
6-iodo-1,2,3,4-tetrahydrobenzothieno[2,3-c]pyridine,
5-iodo-1,2,3,4-tetrahydrobenzothieno[2,3-c]pyridine,
8-iodo-1,2,3,4-tetrahydrobenzothieno[2,3-c]pyridine, and
7-iodo-1,2,3,4-tetrahydrobenzothieno[2,3-c]pyridine.

Acid addition salts of the 1,2,3,4-tetrahydrobenzothieno[2,3-c]pyridine may be prepared by contacting the free base with a suitable acid such as formic acid, citric acid, maleic acid, sulphuric acid, hydrochloric acid, succinic acid, tartaric acid, benzoic acid or fumaric acid.

The compositions of the present invention are useful as central nervous system depressants and tranquilizing agents. In animal tests the compounds have demonstrated an ability to control antisocial aggressive behavior. For example, compositions containing an equivalent of 5 mg./kg. of 1,2,3,4-tetrahydrobenzothieno[2,3-c]pyridine and 6-chloro-1,2,3,4-tetrahydrobenzothieno[2,3-c]pyridine, which are representative of the class, have, when administered intraperitoneally, demonstrated an ability to diminish or inhibit the antisocial behavior characteristics, such as aggression, viciousness and persistence for fighting, which are normally induced by isolation in mice.

The compositions were also found in mouse behavior studies to induce central nervous system depression in intraperitoneal doses containing approximately 10 mg./kg. of the active ingredient. The compositions were found to have $LD_{50}$'s in mice in excess of 100 mg./kg. intraperitoneally of the active ingredient. The behavior studies were conducted in the manner outlined by Irwin in "Animal and Clinical Pharmacologic Techniques in Drug Evaluation," J. H. Nodine and P. E. Siegler, Ed., Year Book Publishers, Inc. 1964, pp. 36–54.

When intended for use as pharmaceuticals the 1,2,3,4-tetrahydrobenzothieno[2,3-c]pyridines are preferably employed in the form of their acid addition salt and are combined with a major amount of one or more suitable pharmaceutical diluents or additives and formed into unit dosage forms, such as capsules or tablets for oral administration or sterile solutions for parenteral administration. The unit dosage forms will generally contain a concentration of 0.1% to 10% or more by weight of one or more of the novel compounds. Generally such dosage forms will contain about 5 to 250 mg. of the active ingredients. One or more of such dosage forms may be administered daily; however, the amount administered will not normally exceed 100 mg./kg. of body weight of the intended recipient.

A typical tablet may have the following composition:

| | Mg. |
|---|---|
| (1) 6 - chloro - 1,2,3,4 - tetrahydrobenzothieno[2, 3-c]pyridine | 20 |
| (2) Starch U.S.P. | 52 |
| (3) Lactose U.S.P. | 68 |
| (4) Talc U.S.P. | 9 |
| (5) Stearic acid | 6 |

Powders 1, 2 and 3 are slugged, then granulated, mixed with 4 and 5 and tableted.

A suitable capsule might be obtained by filling a No. 3 hard gelatin capsule with a mixture of the following ingredients:

| | Mg. |
|---|---|
| (1) 6 - chloro - 1,2,3,4 - tetrahydrobenzothieno[2, 2-c]pyridine | 10 |
| (2) Lactose U.S.P. | 195 |
| (3) Starch U.S.P. | 16 |
| (4) Talc U.S.P. | 8 |

The following examples are presented to illustrate the invention:

EXAMPLE 1

α-(5-chloro-3-thianaphthenylmethyl)malonic acid

To a solution of 45.2 g. of KOH in 45 ml. of water is added 100 ml. of ethanol and 45.2 g. (0.13 mole) of diethyl α - (5 - chloro - 3 - thianaphthenylmethyl) malonate and the mixture is refluxed 22 hours. The alcohol is removed in vacuo after which 200 ml. of water is added and the mixture extracted twice with 100 ml. portions of ether. The aqueous solution is treated with activated charcoal, acidified with concentrated HCl and cooled. The solids are collected and dried to yield α-(5-chloro-3-thianaphthenylmethyl)malonic acid in the form of a yellow solid, M.P. 175–177°.

Analysis.—Calcd. for $C_{12}H_9ClO_4S$ (percent): S, 11.26. Found (percent): S, 11.42.

EXAMPLE 2

β-(5-chloro-3-thianaphthenyl)propionic acid

α - (5 - chloro - 3 - thianaphthenylmethyl)malonic acid (13.5 g., 0.048 mole) is heated at 190–195° for two hours. It is cooled to 25° and 75 ml. are dissolved. It is cooled, extracted twice with 35 ml. of chloroform, treated with activated charcoal and acidified with 10% HCl solution. The acids are collected, washed and dried to yield β-(5-chloro-3-thianaphthenyl)propionic acid. An analytical sample is prepared by recrystallizing twice from ethanol and twice from methanol to yield β-(5-chloro-3-thianaphthenyl)propionic acid in the form of a yellow solid, M.P. 187–189°.

*Analysis*.—Calcd. for $C_{11}H_9ClO_2S$ (percent): C, 54.91; H, 3.77; Cl, 14.74; S, 13.32. Found (percent): C, 55.09; H, 3.79; Cl, 14.83; S, 13.27.

EXAMPLE 3

β-(5-chloro-3-thianaphthenyl)ethylamine hydrochloride

A mixture of 26.8 g. (0.11 mole) of α-(5-chloro-3-thianaphthene)propionic acid and 57 g. (35 ml., 0.48 mole) of $SOCl_2$ is heated to 50° in 0.5 hours and maintained at 50–52° for 1 hour. The excess $SOCl_2$ is removed in vacuo. Benzene (50 ml.) is added to the residue and concentrated to yield β-(5-chloro-3-thianaphthenyl)propionyl chloride in the form of a yellow solid.

A mixture of 32 g. (0.12 mole) of β-(5-chloro-3-thanaphthenyl)propionyl chloride and 34 g. (0.51 mole) of $NaN_3$ in 200 ml. of toluene is refluxed for 23.5 hours. The mixture is cooled, filtered and the filtrate concentrated to yield a brown oil.

To the above oil is added 100 ml. of concentrated HCl with stirring at 25° for 15 minutes, at 80° for 0.5 hours, after which it is refluxed for 6 hours. The mixture is cooled to 25° and 100 ml. of ether added and stirred 0.5 hour. The solids are collected, washed with ether and dried to yield a solid, M.P. 215–237°. An analytical sample is prepared by recrystallizing from activated charcoal-treated ethanol to yield β-(5-chloro-3-thianaphthenyl)ethylamine hydrochloride in the form of a white solid, M.P. 248–250°.

*Analysis*.—Calcd. for $C_{10}H_{11}Cl_2NS$ (percent): C, 48.38; H, 4.47; N, 5.64; S, 12.91. Found (percent): C, 48.18; H, 4.64; N, 5.48; S, 13.02.

EXAMPLE 4

6-chloro-1,2,3,4-tetrahydrobenzothieno[2,3-c]pyridine

To a mixture of 2.39 g. (0.0113 mole) of β-[3-(5-chloro)thianaphthenyl]ethylamine in 10 ml. of water is added slowly 1.3 ml. of concentrated HCl. The solution is heated to 80° and 0.39 g. (0.0129 mole) of paraformaldehyde added in one portion after which heating continued for 1.25 hours at 80–90°. The mixture is cooled to 21°, basified with 10% NaOH solution and extracted twice with 75 ml. portions of ether. The combined extracts are washed with brine, dried, and concentrated to yield a solid which is recrystallized twice from activated charcoal-treated 2-propanol to yield 6-chloro-1,2,3,4-tetrahydrobenzothieno[2,3-c]pyridine as white needles, M.P. 99–100°.

*Analysis*.—Calcd. for $C_{11}H_{10}ClNS$ (percent): C, 59.06; H, 4.51; N, 6.25; S, 14.34.

EXAMPLE 5

When, in the procedure of Example 4, β-[3-(5-chloro)-thianaphthenyl]ethylamine is replaced by an equal molar amount of β-[3-(5-fluoro)-thianaphthenyl]ethylamine,
β-[3-(6-fluoro)-thianaphthenyl]ethylamine,
β-[3-(4-fluoro)-thianaphthenyl]ethylamine,
β-[3-(7-fluoro)-thianaphthenyl]ethylamine,
β-[3-(5-chloro)-thianaphthenyl]ethylamine,
β-[3-(6-chloro)-thianaphthenyl]ethylamine,
β-[3-(4-chloro)-thianaphthenyl]ethylamine,
β-[3-(7-chloro)-thianaphthenyl]ethylamine,
β-[3-(5-trifluoromethyl)-thianaphthenyl]ethylamine,
β-[3-(6-trifluoromethyl)-thianaphthenyl]ethylamine,
β-[3-(4-trifluoromethyl)-thianaphthenyl]ethylamine,
β-[3-(7-trifluoromethyl)-thianaphthenyl]ethylamine,
β[3-(5,6-dimethoxy)-thianaphthenyl]ethylamine,
β-[3-(5-methoxy)-thianaphthenyl]ethylamine,
β-[3-(6-methoxy)-thianaphthenyl]ethylamine,
β-[3-(4-methoxy)-thianaphthenyl]ethylamine,
β-[3-(7-methoxy)-thianaphthenyl]ethylamine,
β-[3-(5-hydroxy)-thianaphthenyl]ethylamine,
β-[3-(6-hydroxy)-thianaphthenyl]ethylamine,
β-[3-(5,6-hydroxy)-thianaphthenyl]ethylamine,
β-[3-(5-bromo)-thianaphthenyl]ethylamine,
β-[3-(6-bromo)-thianaphthenyl]ethylamine,
β-[3-(5-iodo)-thianaphthenyl]ethylamine, and
β-[3-(6-iodo)-thianaphthenyl]ethylamine, respectively, there are obtained, 6-fluoro-1,2,3,4-tetrahydrobenzothieno[2,3-c]pyridine,
7-fluoro-1,2,3,4-tetrahydrobenzothieno[2,3-c]pyridine,
5-fluoro-1,2,3,4-tetrahydrobenzothieno[2,3-c]pyridine,
8-fluoro-1,2,3,4-tetrahydrobenzothieno[2,3-c]pyridine,
6-chloro-1,2,3,4-tetrahydrobenzothieno[2,3-c]pyridine,
7-chloro-1,2,3,4-tetrahydrobenzothieno[2,3-c]pyridine,
5-chloro-1,2,3,4-tetrahydrobenzothieno[2,3-c]pyridine,
8-chloro-1,2,3,4-tetrahydrobenzothieno[2,3-c]pyridine,
6-trifluoromethyl-1,2,3,4-tetrahydrobenzothieno[2,3-c]pyridine,
7-trifluoromethyl-1,2,3,4-tetrahydrobenzothienol[2,3-c]pyridine,
5-trifluoromethyl-1,2,3,4-tetrahydrobenzothieno[2,3-c]pyridine,
8-trifluoromethyl-1,2,3,4-tetrahydrobenzothieno[2,3-c]pyridine,
6,7-dimethoxy-1,2,3,4-tetrahydrobenzothieno[2,3-c]pyridine,
6-methoxy-1,2,3,4-tetrahydrobenzothieno[2,3-c]pyridine,
7-methoxy-1,2,3,4-tetrahydrobenzothieno[2,3-c]pyridine,
5-methoxy-1,2,3,4-tetrahydrobenzothieno[2,3-c]pyridine,
8-methoxy-1,2,3,4-tetrahydrobenzothieno[2,3-c]pyridine,
6-hydroxy-1,2,3,4-tetrahydrobenzothieno[2,3-c]pyridine,
7-hydroxy-1,2,3,4-tetrahydrobenzothieno[2,3-c]pyridine,
6,7-dihydroxy-1,2,3,4-tetrahydrobenzothieno[2,3-c]pyridine,
6-bromo-1,2,3,4-tetrahydrobenzothieno[2,3-c]pyridine,
7-bromo-1,2,3,4-tetrahydrobenzothieno[2,3-c]pyridine,
6-iodo-1,2,3,4-tetrahydrobenzothienol[2,3-c]pyridine, and
7-iodo-1,2,3,4-tetrahydrobenzothieno[2,3-c]pyridine, respectively.

EXAMPLE 6

β-(3-thianaphthenyl)ethylamine

To a suspension of 21 g. (0.55 mole) of lithium aluminum hydride in 450 ml. of anhydrous ether is added a solution of 31.7 g. (0.18 mole) of 3-cyanomethylthianaphthene in 350 ml. of anhydrous ether in 45 minutes. The mixture is stirred at room temperature for 3 hours after which the complex is decomposed by the dropwise addition of 80 ml. of water. The solids are removed by filtration and washed with ether. The filtrate is dried and concentrated in vacuo to yield a brown oil which is fractioned to yield β-(3-thianaphthenyl)ethylamine in the form of a clear liquid, B.P. 109–110°/0.3 mm.

*Analysis*.—Calcd. for $C_{10}H_{11}NS$ (percent): C, 67.75; H, 6.26; N, 7.90. Found (percent): C, 67.49; H, 6.50; N, 7.92.

EXAMPLE 7

1,2,3,4-tetrahydrobenzothieno[2,3-c]pyridine hydrochloride

To a cooled mixture of 20 g. (0.113 mole) of 3-thianaphthenyl)ethylamine and 100 ml. of water is slowly added 13 ml. (0.154 mole) of concentrated hydrochloric acid. Paraformaldehyde (3.9 g., 0.129 mole) is then added in one portion and the mixture heated at 70–80° for 5 hours after which it is cooled, basified with 10% NaOH solution and extracted twice with 125 ml. portions of benzene. The combined extract is washed with water, dried and concentrated. To the residue is added 400 ml. of ether and it is stirred at 21° for 0.5 hours. The insoluble material is filtered and the filtrate acidified with ethereal HCl. The HCl salt is collected, dissolved in 200 ml. of water and filtered. The filtrate is washed twice with 50 ml. portions of $CHCl_3$, basified with 10% NaOH solution, and extracted with 100 ml. of ether. The ether solution is dried and concentrated to yield 1,2,3,4-tetrahydrobenzothieno[2,3-c]pyridine hydrochloride as a clear oil which crystallized upon cooling.

EXAMPLE 8

3-(β-aminoethyl)-thianaphthene-2-carboxylic acid lactam

A mixture of 95 g. (0.47 mole) of 3-(thianaphthenyl)ethyl isocyanate and 380 ml. of concentrated HCl is placed in an ice bath and stirred for 21 hours while allowing the bath to warm to room temperature. The solids are collected, washed with ether and dried to yield crude 3-(thianaphthenyl)ethylamine hydrochloride, M.P. 195–201°.

The crude amine salt is dissolved in 1 liter of water and the insoluble material collected and recrystallized from benzene to give the lactam as light brown plates, M.P. 224–226°.

*Analysis.*—Calcd. for $C_{11}H_9NOS$ (percent): C, 65.00; H, 4.47; N, 6.89. Found (percent): C, 64.89; H, 4.66; N, 7.08.

EXAMPLE 9

1,2,3,4-tetrahydrobenzothieno[2,3-c]pyridine hydrochloride

To a dispersion of 3.0 g. (0.08 mole) of $LiAlH_4$ in 200 ml. of ether is added 4.0 g. (0.02 mole) of 3-(β-aminoethyl)thianaphthene-2-carboxylic acid lactam and the mixture allowed to reflux for 3.5 hours. The complex mixture is decomposed with 12 ml. of water, and the solids removed. The organic solution is dried and concentrated. The residual oil in ether was acidified with ethereal HCl. The precipitated solids are recrystallized from ethanol to yield 1,2,3,4-tetrahydrobenzothieno[2,3-c]pyridine hydrochloride as a light texture white solid, M.P. 264–265°.

*Analysis.*—Calcd. for $C_{11}H_{12}ClNS$ (percent): C, 58.53; H, 5.35; N, 6.21; S, 14.20. Found (percent): C, 58.60; H, 5.42; N, 6.16; S, 14.49.

I claim:
1. A pharmaceutical composition for oral administration to an animal to control antisocial behavior selected from the group consisting of capsules and tablets comprising a pharmaceutical diluent in combination with a safe and effective amount of a compound selected from the group consisting of a compound of the formula

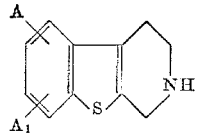

in which A and $A_1$ are selected from hydrogen, chloro, fluoro and trifluoromethyl, and the pharmaceutically acceptable acid addition salts thereof.

2. A composition of claim 1 in which A is hydrogen and $A_1$ is selected from chloro, fluoro and trifluoromethyl.

3. A composition of claim 1 in which A is hydrogen and $A_1$ is fluoro.

4. A composition of claim 1 in which A is hydrogen and $A_1$ is chloro.

5. A composition of claim 1 in which A and $A_1$ are hydrogen.

6. A method of reducing antisocial behavior in an animal which comprises administering to said animal a safe and effective amount of a composition of claim 1.

7. A method of causing central nervous system depression in an animal which comprises administering to said animal a composition of claim 1.

References Cited

Herz, J.A.C.S., 72 , pp. 4999–5001 (1950).

STANLEY J. FRIEDMAN, Primary Examiner